United States Patent
Pochatila et al.

(10) Patent No.: US 7,628,457 B2
(45) Date of Patent: Dec. 8, 2009

(54) AXLE HOUSING AND SPINDLE ASSEMBLY

(75) Inventors: Paul David Pochatila, Mentor, OH (US); Mark Richard Knight, Mentor, OH (US)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/568,894

(22) PCT Filed: Aug. 20, 2004

(86) PCT No.: PCT/US2004/027141
§ 371 (c)(1),
(2), (4) Date: Mar. 19, 2007

(87) PCT Pub. No.: WO2005/021288
PCT Pub. Date: Mar. 10, 2005

(65) Prior Publication Data
US 2007/0228810 A1 Oct. 4, 2007

(51) Int. Cl.
*B60B 35/00* (2006.01)
(52) U.S. Cl. .................. 301/132; 301/124.1; 301/137; 180/344; 180/378; 74/607
(58) Field of Classification Search ............. 301/124.1, 301/131, 132, 137; 74/606 R, 607; 180/344, 180/346, 378, 377
See application file for complete search history.

(56) References Cited

U.S. PATENT DOCUMENTS

| | | | | |
|---|---|---|---|---|
| 1,318,557 A * | 10/1919 | Heinze | ........................ | 180/6.2 |
| 1,342,687 A * | 6/1920 | Melanowski | ................. | 74/391 |
| 1,363,882 A * | 12/1920 | Klocke | ......................... | 74/607 |
| 1,391,294 A * | 9/1921 | Barbarou | ...................... | 74/607 |
| 1,692,932 A * | 11/1928 | Ford | ......................... | 228/173.1 |
| 2,226,327 A * | 12/1940 | Smesne | .................. | 280/93.505 |
| 2,471,429 A * | 5/1949 | Hawkins | ...................... | 180/291 |
| 2,570,191 A | 10/1951 | Beckwith | | |
| 2,612,231 A * | 9/1952 | Bretschneider | ............. | 180/358 |
| 2,904,145 A * | 9/1959 | Sheppard | .................... | 192/218 |
| 3,142,203 A * | 7/1964 | Bamford | ..................... | 475/237 |
| 3,308,683 A | 3/1967 | Herman | | |
| 3,751,924 A * | 8/1973 | Brown et al. | ................... | 60/485 |
| 4,100,987 A * | 7/1978 | Hildebrecht | ................ | 180/339 |
| 4,221,138 A * | 9/1980 | Stewart et al. | ................ | 74/607 |
| 6,257,090 B1 * | 7/2001 | Arakawa et al. | .............. | 74/607 |
| 6,523,844 B2 * | 2/2003 | Panizzolo | ............ | 280/124.111 |
| 2004/0262070 A1 * | 12/2004 | Uemura et al. | .............. | 180/378 |
| 2009/0178875 A1 * | 7/2009 | Bowers | ....................... | 180/359 |

FOREIGN PATENT DOCUMENTS

JP 63270201 8/1988

* cited by examiner

*Primary Examiner*—Russell D Stormer
(74) *Attorney, Agent, or Firm*—Tarolli, Sundheim, Covell & Tummino, LLP

(57) ABSTRACT

An axle assembly (10) for a wheeled vehicle includes a cylindrical housing (12a) defining a pair of spindle mounting flanges (30). A pair of spindles (16) is secured to the flanges. A plurality of tension rods (60) extend between the spindles at the bottom side of the cylindrical housing and apply clamping forces to the spindles urging the spindles into mounting contact with the spindle mounting flanges and also concurrently couple the flanges to each other. The coupling of the flanges to each other generates a tension force in each tension rod, whereby bending loads exerted by the spindles are shared between the housing and the tension rods.

14 Claims, 3 Drawing Sheets

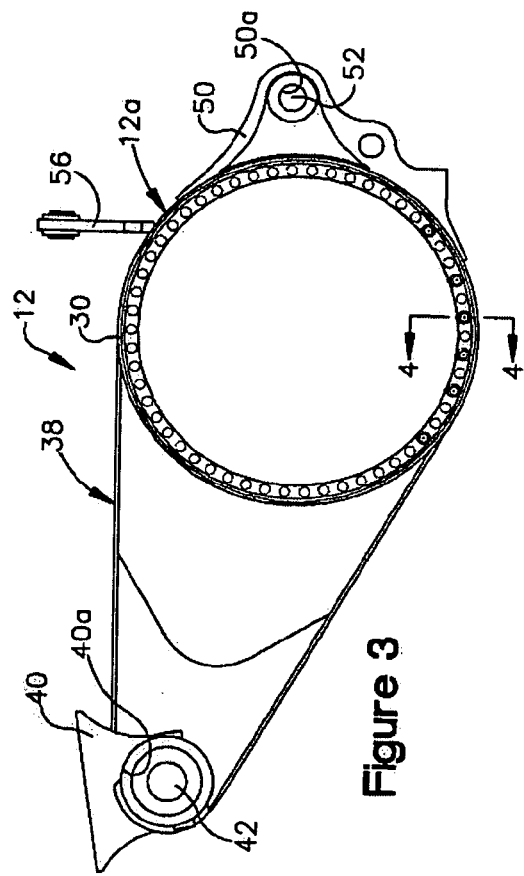
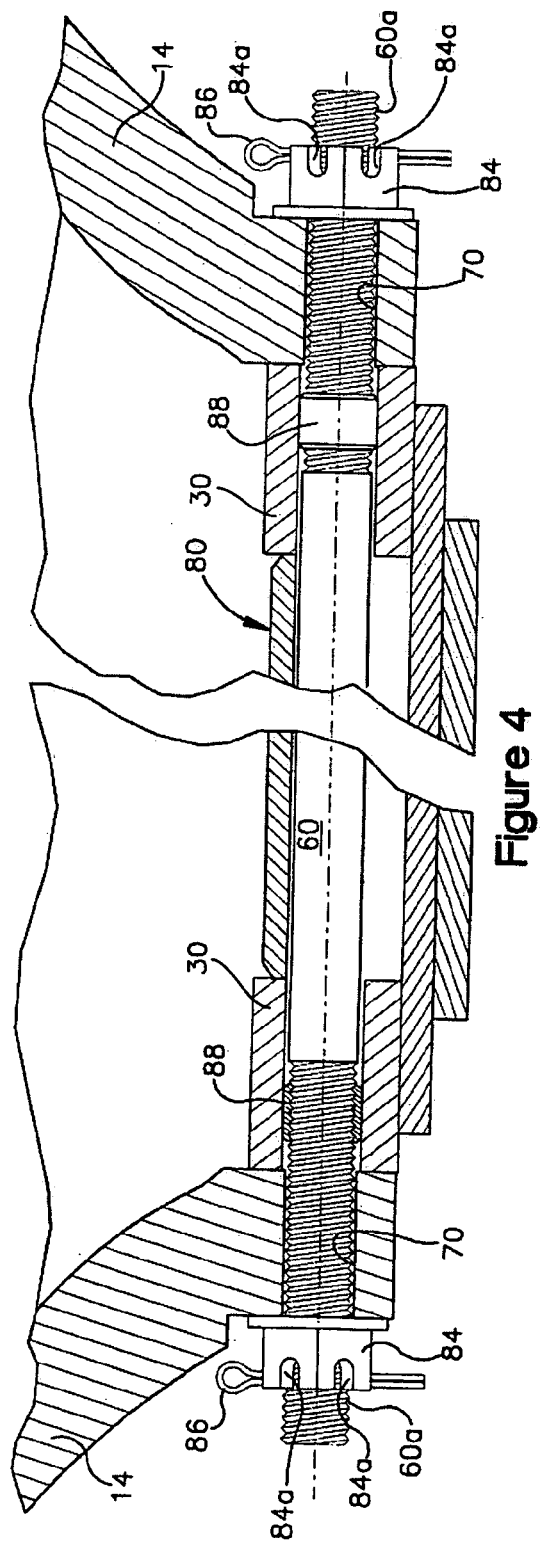

AXLE HOUSING AND SPINDLE ASSEMBLY

TECHNICAL FIELD

This invention relates generally to suspensions for large hauling vehicles and particular to an improved axle housing assembly.

BACKGROUND ART

Large hauling vehicles such as those used for highway construction and mining operations, typically utilize a fabricated axle construction. The axle generally includes an axle housing to which wheel spindles are rigidly attached. The axle housing is coupled to the vehicle frame utilizing suspension struts on a trailing side of the housing. The leading or forward side of the housing may be coupled to the frame via a suspension arm including a pivot connection.

To reduce weight without sacrificing strength, some axle housings are fabricated as a weldment. For example, in an axle of the type that utilizes electric traction motors, the wheels spindles are attached to a fabricated, cylindrical shaped housing member. The traction motors for the wheels are typically enclosed within the housing member.

When fully loaded, a significant, predominantly bending load is applied to the axle housing member. In particular, a substantial portion of the vehicle's weight is borne by the rear wheels, which are rotatably attached to the spindles. The spindles are typically bolted to the sides of the axle housing. Under load, the wheels generate a bending load on the spindles. The spindles in turn transfer this bending load to the axle housing. As a result of this bending load, the upper portion of the axle housing is under a compressive load whereas the lower portion of the housing is under substantial tension.

It has been found that large loads applied to the housing especially when the vehicle is overloaded, can produce premature fractures or other failures in the housing. It is believed that these failures are primarily due to the tension force that is applied to the lower portion of the wheel motor housing by the spindles.

DISCLOSURE OF INVENTION

The present invention provides a new and improved axle assembly especially suitable for use on large hauling vehicles such as those used for highway construction and mining operations.

According to the invention, the axle assembly includes an axle housing member that defines spindle mounting regions which, in the illustrated embodiment, comprise circular flanges. Spindles are secured to respective circular flanges. A plurality of coupling members extend between the spindles and mechanically couple the spindles to each other and to the axle housing member. With the present invention, bending loads exerted by the spindles are shared between the housing member and the coupling members.

In the preferred and illustrated embodiment, the coupling members comprise elongate tension rods which extend between and are secured to the spindles. In conventional constructions, the spindles are secured to the flanges using threaded fasteners, such as bolts, which clamp a flange forming part of the spindle to an associated flange defined by the housing. In the preferred and illustrated embodiment of the invention, the tension rods replace certain of the bolts that otherwise would be used to fasten the spindles to the flanges. Because the tension rods extend between the spindles, they mechanically couple the spindles to each other so that bending loads exerted by the spindles are at least partially borne by the tension rods themselves. In prior art constructions, the bending loads exerted by the spindles are borne entirely by the mounting flanges forming part of the housing.

In the illustrated embodiment, six tension rods are used to mechanically couple lower portions of the spindles. According to a feature of the invention, each tension rod includes retaining elements mounted near the ends of each tension rod which inhibit removal of a tension rod when the spindles are installed. These retaining elements which in the preferred embodiment comprise threaded collars having a diameter larger than the diameter of the spindle holes through which the tension rods extend, inhibit ejection of the tension rod or tension rod portions should breakage occur.

In the preferred and illustrated embodiment, the axle housing includes reinforcement members in the regions of the housing where the tension rods extend. These reinforcing members are placed in the vicinity of the tension rods and accommodate the preload placed on the rods (which apply a compression force on the housing member). The tension rods are preloaded during installation and/or assembly of the axle.

Additional features of the invention will become apparent and a fuller understanding obtained by reading the following detailed description made in connection with the accompanying drawings.

BRIEF DESCRIPTION OF DRAWINGS

FIG. 3 is a side-elevational view of the axle housing assembly as seen from the plane indicated by the line 3-3 in FIG. 2; and FIG. 4 is a fragmentary sectional view as seen from the plane indicated by the line 4-4 in FIG. 3.

BEST MODE FOR CARRYING OUT THE INVENTION

Figure 1:
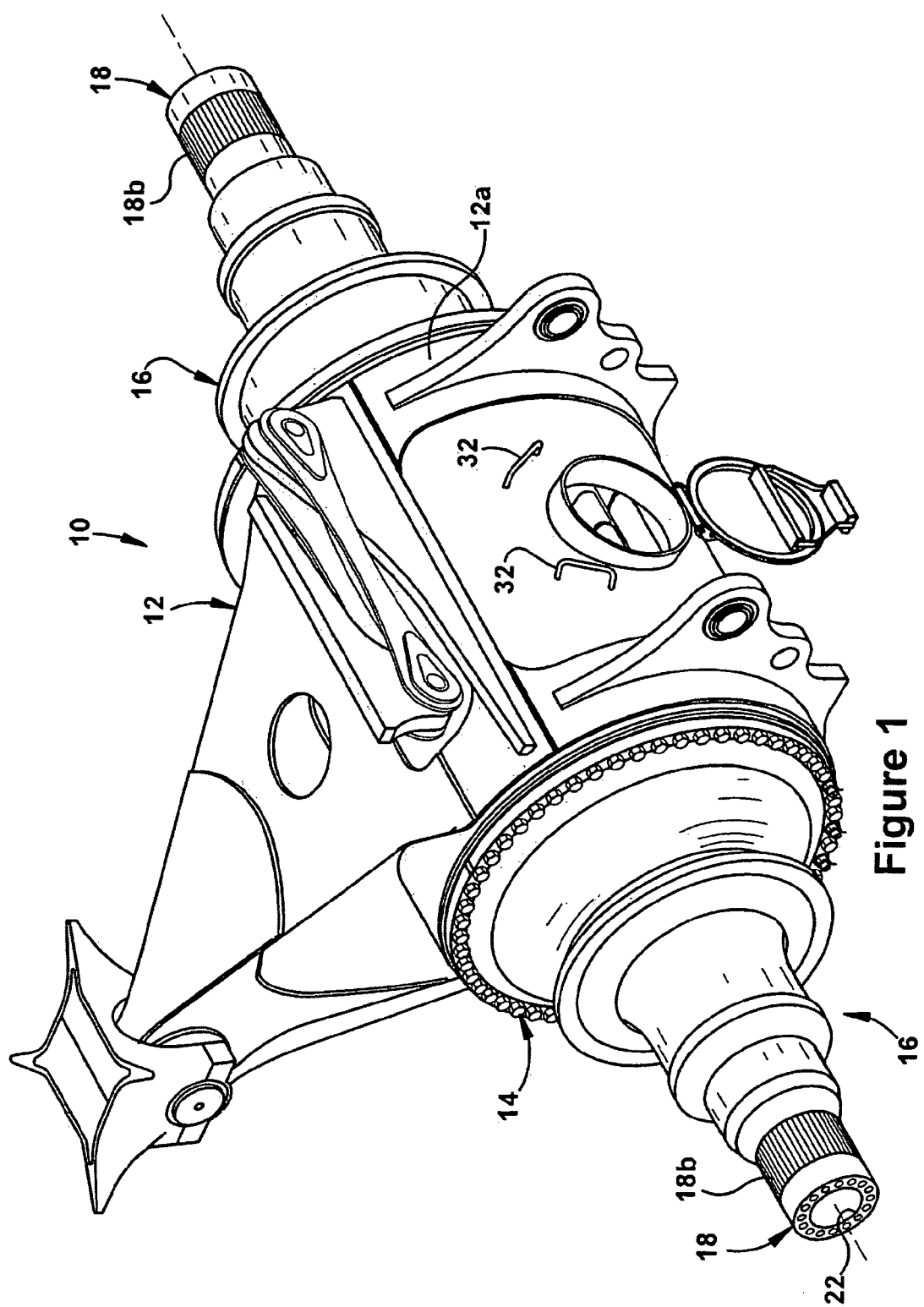
FIG. 1 is a perspective view of an axle housing assembly constructed in accordance with a preferred embodiment of the invention.

FIG. 1 illustrates a rear axle 10 for a large hauling vehicle of the type used in construction and mining operations. The illustrated axle is constructed in accordance with a preferred embodiment of the invention and includes a housing assembly 12 to which a pair of spindles 14 are attached. The illustrated axle is of the type that utilizes electric traction motors (not shown) which are directly or indirectly coupled to outboard wheels (not shown). In the axle construction shown in FIG. 1, the spindles 14 may be conventional.

The housing assembly 12 includes a cylindrical housing member 12a. As seen in FIG. 1, the spindles 14 are secured to opposite sides of the housing assembly 12 by a plurality of bolts and other securement devices (to be explained).

As is conventional, each spindle 14 defines structure (indicated generally by the reference character 16) that forms a mounting for wheel hubs and associated bearings (not shown). The outboard ends of the spindle include a reduced diameter portion 18 which, in the illustrated embodiment, includes a spline section 18b. Typically, the spline section engages an outboard planetary unit (not shown) that is secured to the end of the spindle. The planetary unit is driven by an axle or, in this case, a motor shaft that extends from the traction motor (not shown) and out through a spindle opening or bore 22. An example of a planetary unit can be seen in copending application Ser. No. 10/399,199, filed Apr. 11, 2003, now U.S. Pat. No. 7,204,782 which is hereby incorporated by reference.

The housing assembly 12, which in the illustrated embodiment is referred to as a wheel motor housing since it is designed to house traction motors (not shown), is a fabricated weldment, or alternately a casting.

Figure 2:
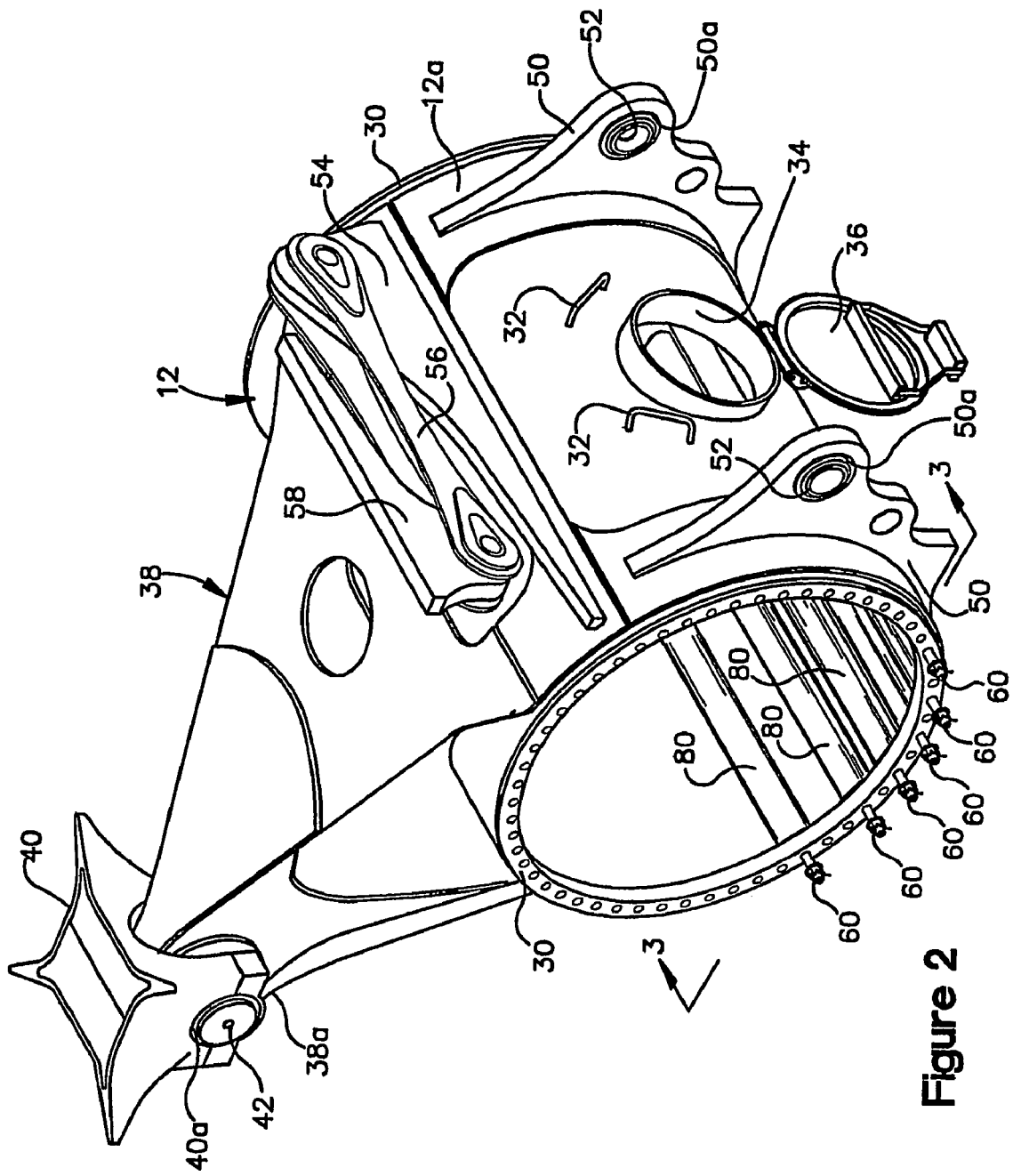
FIG. 2 is a perspective view of the axle assembly shown in FIG. 1 with spindles removed.

Referring also to FIG. 2, the housing assembly 12 includes the cylindrical housing member 12a which surrounds the wheel motors (not shown) and which define mounting flanges 30 for the spindles 14. The cylindrical housing member 12a also includes an access port 34 and hingedly mounts an access door 36 for closing off the access port. A pair of hand holds 32 is provided to facilitate entry into the housing member 12a via the access port 34. A leading, A-frame or A arm 38 is welded to the housing member 12a and defines a mounting point for the housing with respect to the vehicle frame. In particular, a forward end 38a of the A-frame is captured in a mounting bracket nose cone mount 40 that is welded to the vehicle frame (not shown) The nose cone mount defines spaced apart apertures 40a (only one is shown) for receiving a mounting pin 42 that extends through the apertures of the nose cone mount. In most applications, the apertures 40a mount conventional bushings through which the mounting pin 42 extends.

A pair of spaced apart strut plates or ears 50 are welded to the wheel motor housing member 12a. The strut plates 50 define lower mounting points for suspension struts (not shown). In particular, each ear 50 includes an aperture 50a which mounts an associated bushing 52. Each bushing 52 is adapted to receive a pin which extends through apertured ears (not shown) on the strut, thereby pivotally attaching the strut to the housing assembly 12. An example of the type of strut that may be used is illustrated in, U.S. Pat. No. 4,140,304, which is hereby incorporated by reference.

A mounting lug 54 is welded near the top of the housing member 12a and defines a lower mounting point for a track rod 56. As is known, the track rod 56 controls the lateral position of the axle with respect to the vehicle frame. The left end of the track rod (as viewed in FIG. 1) is pivotally connected to an upper lug which is secured, as by welding, to the vehicle frame.

In operation, the weight of the rear of the vehicle is supported by the outboard mounted wheels. As a consequence, a bending load is applied to the housing member 12a by the spindles 14. In particular, the upper half of the spindles 14 are urged towards each other and, therefore, apply a compression load to the upper portion of the housing flanges 30. The lower portion of the spindles are urged away from the housing member 12a and, thus, apply a tension force to the lower portion of the housing flanges 30. These forces can be substantial and it has been found if excessive load is applied to the housing member 12a, the tension forces in a conventional housing may cause a fracture or breakage in the housing 12a.

In accordance with the invention, these tension forces which would otherwise cause failure in a conventional housing are substantially reduced by mechanically coupling the lower portions of the spindles 14 to the housing and to each other. In the preferred embodiment, this is achieved by a plurality of tension rods 60, the construction of which is best shown in FIG. 4. In the illustrated embodiment, six such tension rods are utilized. The spindles 14 are mechanically coupled to the housing by direct mounting with conventional hardware and to each other by means of the tension rods 60. As a result of the coupling, the bending loads from the spindles 14 are shared between the housing 12a and the tension rods 60. The load transferred to the tension rod from one spindle is negated by the load transferred into the rod from the opposite side spindle.

In the event that the axle housing stiffness changes during sustained operation, the loading on the tension rods 60 will increase to compensate for the loss of stiffness in the axle housing. Shifting more of the loads to the rods 60 will prolong the operational life of the axle housing 12, thus resulting in a much improved axle assembly.

Referring in particular to FIG. 4, each tension rod 60 comprises an elongate rod having threaded ends 60a. Each tension rod extends through an associated aperture 70 in each spindle 14. The rods 60 extend through regions in the cylindrical housing 10a defined by a spacer structure indicated generally by the reference character 80. The tension rods 60 are adapted to receive nuts 84 at opposite ends of the rods 60 which are tightened to apply clamping forces against the spindle whereby the lower portions of the spindle are clamped together via the tension rods 60. In the illustrated embodiment, the nuts 84 may be castle nuts and include a plurality of recesses 84a which are designed to cooperate with cotter pins to inhibit rotation of the nuts 84 after installation.

In the preferred embodiment, the nuts 84 are tightened until a predetermined tension force is created in the tension rod by virtue of its elongation. In the preferred embodiment, each end of the tension rod includes a cross or diametral bore adapted to receive a cotter pin 86. The distance between these cotter pin bores are selected such that when the nuts 84 are tightened to the point where the cotter pin holes in the rod 60 are fully exposed by pairs of the cotter pin recesses 84a in the respective nuts 84, the desired tension force is achieved. The cotter pins 86 are then inserted through the bores as shown in FIG. 4 in order to inhibit rotation of the nuts 84.

According to a feature of the invention, retaining collars 88 are positioned on each threaded end 60a of each rod 60. Each retaining collar 88 defines a diameter that is slightly larger than the diameter of the tension rod holes 70 formed in the spindles 14. With the retaining collars 88 in the positions shown in FIG. 4, the tension rod 60 cannot be withdrawn from the housing through the apertures 70 defined in the spindle housings 14. With this feature, should a fracture occur in a tension rod 60, the tension rod pieces cannot be ejected or removed from the axle housing assembly 12.

Referring to FIGS. 2 and 4, the cylindrical housing 12a is preferably reinforced in the lower region (where the tension rods 60 are located) in order to accommodate the forces generated by the preloading of the rods 60. The tension rods 60, when preloaded, exert as compression force on the lower portion of the axle housing member 12a. In the illustrated embodiment, the spacer structure also serves as the reinforcement and includes channel-like housings 80 which extend between the lower portion of the circular flanges 30. It should be noted that various methods of reinforcing the housing can be employed. For example, if the housing 12a is a casting, gussets or reinforcing ribs may be cast directly into the housing in the region where the tension rods 60 are used. In a fabricated weldment, as seen in FIG. 2, channel-like members may be welded into position. Alternately, ribs or gussets could also be welded in the lower portion of the housing member 12a to provide the added reinforcement needed to accommodate the added compression force generated by the tension rod preload.

In the illustrated embodiment, six tension rods 60 are utilized. The number and/or size of the tension rods 60 are determined by the loads that are expected to be exerted on the housing member 12a during vehicle operation. These loads and the consequent number of tension rods that need to be installed to accommodate the load are easily determined by those skilled in the art using known methods, such as finite element analysis.

With the present invention, a substantially stronger fabricated type axle housing can be produced without excessive cost and without substantially increasing weight of the housing assembly. The present invention thus provides an extremely cost effective solution to fatigue and load related failures in axle housings that are known in the prior art.

Although the invention has been described with a certain degree of particularity, those skilled in the art can make various changes to it without departing from the spirit or scope of the invention as hereinafter claimed.

We claim:

1. An axle assembly for a wheeled vehicle, comprising:
   a) an axle housing member defining spindle mounting regions;
   b) a pair of spindles secured to said mounting regions on said axle housing member;
   c) said pair of spindles including first portions operative to apply compression forces to first portions of said mounting regions and said pair of spindles including second portions applying tension forces to second portions of said mounting regions on said axle housing member; and
   d) a plurality of coupling members extending between said second portions of said spindles and mechanically coupling said second portions of said spindles to each other and to said second portions of said housing member, whereby bending loads exerted by said spindles are shared between said housing member and said coupling members.

2. The axle assembly of claim 1, whereby said coupling members comprise elongate tension rods extending between and secured to said spindles.

3. The axle assembly of claim 2, wherein said tension rods carry retainers which inhibit removal of said tension rods while said, spindles are secured to said housing member.

4. The axle assembly of claim 2 including six tension rods.

5. The axle assembly of claim 4, wherein said retainers comprise threaded members positioned on the outboard ends of each tension rod and are located inboard of said mounting regions defined by said axle housing.

6. The axle assembly of claim 5, wherein said mounting regions comprise circular flanges.

7. The axle of claim 1, wherein said housing member is a cylindrical housing and is a fabricated weldment.

8. The axle of claim 7, wherein said cylindrical housing serves as a enclosure for wheel motors.

9. An axle assembly for a wheeled vehicle, comprising:
   a) a cylindrical housing member defining a pair of circular, spaced apart spindle mounting flanges, said housing member comprising a fabricated weldment;
   b) a pair of spindles secured to said pair of mounting flanges;
   c) each spindle of said pair having a first portion that applies a tension force to said housing member when said wheeled vehicle is in operation;
   d) a plurality of tension rods extending between said spindles;
   e) said tension rods extending between said portions of said spindles;
   f) securement devices operatively engaged by outboard ends of said tension rods, said devices applying a clamping force urging said spindles towards their associated mounting flanges while concurrently generating a tension force in each tension rod whereby bending loads exerted by said spindles are shared between said housing and said tension rods; and
   g) a plurality of threaded fasteners in a second portion of said spindles securing said spindles to said housing, said threaded fasteners having a length less than the distance between the spindles.

10. The axle assembly of claim 9 including six tension rods.

11. The axle assembly of claim 9 wherein said outboard ends of said tension rods are threaded and extend through aligned apertures in said spindle mounting flanges and said spindles, said securement devices comprising threaded fasteners threadedly received by said threaded outboard ends of said tension rods.

12. The axle assembly of claim 11 further comprising tension rod retainer members threadedly received by said threaded ends of said tension rods and located inboard of said spindles, and sized to be larger than said spindle apertures whereby removable of said tension rods is inhibited while said spindles are secured to said mounting flanges.

13. An axle assembly for a wheeled vehicle, comprising:
   a) an axle housing member defining spindle mounting regions;
   b) a pair of spindles secured to said mounting regions on said axle housing member;
   c) said pair of spindles including first portions operative to apply compression forces to associated first portions of said mounting regions and said pair of spindles including second portions applying tension forces to associated second portions of said mounting regions on said axle housing member;
   d) a plurality of fasteners for removably attaching said spindles to said mounting regions;
   e) a plurality of tension rods extending between said second portions of said spindles;
   f) each of said tension rods including threaded ends, each end extending through aligned apertures in a second portion of said mounting regions and said second portion of said spindle; and
   g) threaded members associated with said threaded ends for clamping said second portions of said spindles to said second portion of said mounting regions on said housing member whereby said tension rods are placed under tension so that bending loads applied by said spindles to said housing member tending to separate said spindles from said housing member are received by said tension rods.

14. The axle assembly of claim 13 further comprising retainer members threadedly received by said threaded ends of said tension rods and located inboard of said spindle apertures and sized to be larger than said spindle apertures whereby said tension rods are inhibited from being removed while said spindles are attached to said housing member.

* * * * *